May 31, 1960    A. J. RHODES    2,938,406
RATCHET LEVER
Filed Feb. 25, 1958
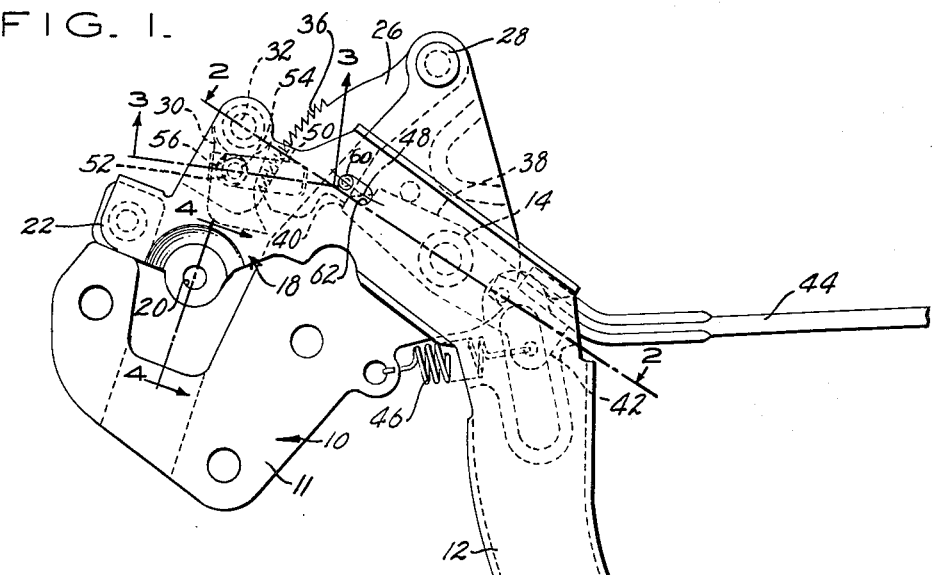
FIG. 1.
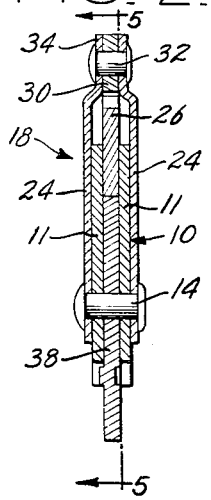
FIG. 2.
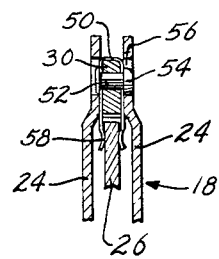
FIG. 3.
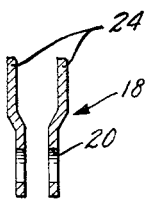
FIG. 4.
FIG. 5
INVENTOR.
ALBERT J. RHODES
BY Whittemore Hulbert
Belknap
ATTORNEYS

United States Patent Office 2,938,406
Patented May 31, 1960

2,938,406

RATCHET LEVER

Albert J. Rhodes, Lake Orion, Mich., assignor to American Forging & Socket Company, Pontiac, Mich., a corporation of Michigan Filed Feb. 25, 1958, Ser. No. 717,438

8 Claims. (Cl. 74—576)

The present invention relates to an improved brake applying and release mechanism for parking brakes and the like, and more particularly to a silent pawl and ratchet type release mechanism.

Pawl and ratchet type mechanisms for applying and releasing automobile parking brakes in common and widespread use. Characteristically, the application of the brake by such a mechanism is attended by a clicking noise as the ratcheting action takes place. Certain automotive manufacturers consider that this noise is desirably eliminated.

Therefore, it is an object of the invention to provide a pawl and ratchet type brake applying and release mechanism which is silent in both its operations of applying and releasing a service brake or the like.

Another object is to provide a silent release mechanism of this type, in which, during the brake applying movement of the mechanism, the ratchet engaging pawl is moved out of contacting relation to the ratchet sector, with which it immediately has latching engagement once the brake applying effort is discontinued.

Yet another object is to provide a silent pawl and ratchet mechanism as described, in which the movement of the pawl away from ratcheting contact with the sector, during the brake applying movement, is effected through the agency of a very simple spring device. This device has sliding frictional engagement with the ratchet sector or other relatively stationary part, in a brake applying movement of a part on which the pawl is pivoted, in a manner to swing the pawl about its pivot and out of clicking engagement with the ratchet teeth of the sector.

By the same token, a reverse frictional action arises as brake applying effort is discontinued, instantaneously swinging the pawl oppositely and into latching engagement with the teeth of the sector.

Another specific object is to provide a friction-responsive, silent pawl and release mechanism for a service brake or the like, which is of a type featuring a pivotally mounted ratchet sector releasably held for latching engagement by the pawl, and in which stop provision is made to prevent the frictional drag of the spring device, in lifting the pawl out of ratchet engagement, from correspondingly moving the ratchet sector and thereby preventing the pawl from clearing the ratchet teeth.

The foregoing as well as other objects will become more apparent as this description proceeds, especially when considered in connection with the accompanying drawings illustrating a preferred embodiment of the invention, wherein:

Fig. 1 is a side elevational view of the improved ratchet lever mechanism of the invention;

Figs. 2, 3 and 4 are fragmentary views in section along the lines 2—2, 3—3 and 4—4, respectively, of Fig. 1; and Fig. 5 is a view in section on line 5—5 of Fig. 2.

Referring to Fig. 1 of the drawings, the reference numeral 10 designates a fixed mounting plate or bracket of the improved mechanism, which is suitably mounted adjacent the automotive dashboard. As indicated in Fig. 2, the bracket 10 is comprised of a pair of parallel laterally spaced plate members 11 which are disposed between portions of the lever of the mechanism, to be described, and between which the ratchet of the mechanism is received, as also to be described.

The brake operating lever of the mechanism is in the form of a pedal 12 pivotally mounted on bracket 10 at 14, this pedal including a foot engaged portion 16 depending from the pivot and a pawl carrying member or head 18 above the pivot. Head 18 carries an eye opening at 20, to which a suitable cable (not shown) connecting the mechanism to the brake system of a vehicle may be attached. This cable connection is a spring urged one and an abutment 22 on head or member 18 limits the counterclockwise movement of the latter by engaging a stop portion of the bracket 10.

It is to be understood that, though a pedal operated type of mechanism is shown herein, the application of the principle of the invention to equivalent known mechanisms, such as the direct cable pull type, is contemplated.

As illustrated in Fig. 2, the pawl carrying member 18 of the pedal or lever 12 is formed by a pair of laterally spaced lever head plates 24, one on either outer side of the bracket plates 11, and a ratchet member or sector 26 having a plurality of ratchet elements or teeth thereon has a freely pivoted mount between these plates at 28.

The pawl element of the mechanism is designated 30, and it is pivoted at 32 between inwardly offset extensions 34 of the lever head plates 24.

In accordance with the invention, this pawl has silent ratcheting engagement with the teeth 36 of the ratchet member or sector 26 only at the end of the clockwise movement of lever head 18. Contrary to the usual pawl and ratchet type operation, it is not urged directly for engagement with the ratchet sector by conventional spring means biasing it about its pivot. As indicated above, it is a basic object of the invention to avoid the annoying clicking noise attending the movement of such a spring biased pawl across the ratchet as the brake is applied. Therefore, in further accordance with the invention the improved frictional spring clip means, presently to be described, is provided to insure an instantaneous latching engagement of the pawl 30 with the elements or teeth 36 of ratchet member or sector 26, after the pawl has been moved clockwise over the sector, and out of contact therewith, for such engagement.

Further provisions which constitute no part of the present invention are made to sustain the pivoted ratchet sector 26 in position for such engagement by the pawl element 30, and to enable the sector to drop counterclockwise about its pivot 28, and out of such engaging position, when the brake mechanism is released. To this end, an abutment or lever member 38 is provided, in the form of an arm medially pivoted between the bracket plates 11 and coaxially of the lever head 18, i.e., at pivot 14. The abutment 38 is normally engageable beneath the free end of the sector 26, i.e., at the upper surface 40 of the abutment, to hold the sector rigidly in its operative position illustrated in Fig. 1. The lower end of the abutment 38 has a bracket or extension 42 thereon, to which a release operating lever 44 is fixedly secured.

Accordingly, upon lifting of the arm 44, the abutment 38 is swung counterclockwise about its pivot 14, disengaging its abutment surface 40 from the sector 26 and releasing the latter by allowing it to drop downwardly about its pivot.

A tension coil spring 46 connected between bracket 10 and the lever extension 42 opposes this release movement. The same spring re-engages the abutment 38 beneath sector 26, by swinging the abutment clockwise and causing a cam surface 48 thereon to force the sector upwardly.

In accordance with the improvement of the invention, the pawl 30 is straddled (as shown in Figs. 1 and 3) by a leaf type of friction clip element or spring 50 of U-shaped cross section. A rivet 52 having an enlarged head 54 secures the spring in straddling relation to the pawl 30, and the head 54 of the rivet is laterally received in an enlarged opening 56 into the adjacent plate 24 of the pawl carrying head 18. As best shown in Fig. 3, the parallel arms 58 of the friction element or spring 50 overlap either side of the ratchet sector 26, being in spring frictional engagement therewith.

It is seen from the foregoing that, with the pawl carrying head in the inoperative, brake release position of Fig. 1, the clockwise movement imparted to the head by depressing pedal lever 12 will swing the pawl 30 upwards and to the right over the relatively fixed ratchet sector 26. As this motion commences the spring arms 58 will, in frictionally engaging the sector, cause the pawl 30 to which they are fixedly attached to be swung clockwise about its pivot at 32 onto the pawl head. This moves the pawl out of positon for engagement with the ratchet elements or teeth of sector 36 in the brake engaging movement of the pawl. The extent of this clearance movement is determined by the engagement of the rivet head 54 with the top side of the opening 56, as viewed in Fig. 1.

When the pedal has been depressed the desired extent and pressure thereon is released, the same frictional action between spring 50 and sector 26, in the reverse frictional sense, takes place. The pawl is instantaneously drawn counterclockwise about its pivot 32 to engage the ratchet sector.

As pointed out above, the brake is released by manipulating lever 44 to remove the abutment support beneath ratchet sector 26. In order to prevent the pawl, when lifted up for clearance in the manner described above, from similarly lifting ratchet sector 26, and thus preventing the desired clearance, a pin and slot connection between sector 26 and fixed mounting bracket plates 11 is provided. That is, the sector has a pin 60 fixed thereon and extending beyond either side thereof, and the mounting plates each have an elongated slot 62 formed therein to receive the ends of the pin. Thus, as the pawl 30 lifts for clearance with the sector it cannot, due to drag of its clip spring 50, lift the sector unduly. The pin 60 engages the top of the slot 62 to limit upward travel of the sector, and the pawl is properly cleared relative to the teeth of the latter. By the same token, engagement of the rivet head 54 on pawl 30 with the bottom of slot 56 in the lever head plate 24 prevents the pawl from following the sector 26 downwardly when the latter is released. Clearance between pawl and sector is maintained.

The mechanism is extremely simple of design and inexpensively produced. There is absolutely no ratchet noise in operation and, since the clip spring 50 is located very closely to the pivot 32 of pawl 30, a very slight retrograde movement, as brake applying pressure is released, immediately engages the pawl with the sector to hold the brake.

The drawing and the foregoing specification constitute a description of the improved ratchet lever in such full, clear, concise and exact terms as to enable any person skilled in the art to practice the invention, the scope of which is indicated by the appended claims.

What I claim as my invention is:

1. A silent pawl and ratchet type control mechanism for operating and releasing a brake or like unit, comprising a movable member and a further member relative to which said first named member moves, one of which members is a pawl-carrying member having a pawl element mounted for movement thereon, the other being a ratchet member having a ratchet element releasably engageable by said pawl to hold said unit, said movable member being adapted to be operatively connected to said unit and having means mounting the same for movement in a path adjacent and along said further member in operating said unit, an abutment having means mounting the same for movement into and out of position in which it supports said further member for said holding engagement of said pawl and said ratchet elements, said further member being mounted for movement out of position from said holding engagement of said elements when said abutment is moved out of said supporting position, and a friction element on one of said first-named elements frictionally engaged with the other thereof for moving said pawl element on said pawl-carrying member out of position for said holding engagement upon relative movement of said members in said path.

2. A silent pawl and ratchet type control mechanism for operating and releasing a brake or like unit, comprising a movable member and a further member relative to which said first named member moves, one of which members is a pawl-carrying member having means mounting a pawl element for movement thereon, the other being a ratchet member having a ratchet element releasably engageable by said pawl element to hold said unit, said movable member being adapted to be operatively connected to said unit and having means mounting the same for movement in a path adjacent and along said further member in operating said unit, an abutment having means mounting the same for movement into and out of position in which it supports said further member for said holding engagement of said pawl and ratchet elements, said further member having means mounting the same for movement in a release direction out of position from said holding engagement of said elements when said abutment is moved out of said supporting position, a friction element on one of said first-named elements frictionally engaged with the other thereof for moving said pawl element on said pawl-carrying member out of position from said holding engagement upon relative movement of said members in said path, and means restraining said further member from movement from said abutment-supported position thereof under frictional drag of said friction element.

3. A silent pawl and ratchet type control mechanism for operating and releasing a brake or like unit, comprising a movable member and a further member relative to which said first named member moves, one of which members is a pawl-carrying member having means mounting a pawl element for movement thereon, the other being a ratchet member having a ratchet element releasably engageable by said pawl element to hold said unit, said movable member being adapted to be operatively connected to said unit and having means mounting the same for movement in a path adjacent and along said further member in operating said unit, an abutment having means mounting the same for movement into and out of position in which it supports said further member for said holding engagement of said pawl and ratchet elements, said further member having means mounting the same for movement in a release direction out of position from said holding engagement of said elements when said abutment is moved out of said supporting position, a friction element on one of said first-named elements frictionally engaged with the other thereof for moving said pawl element on said pawl-carrying member out of position from said holding engagement upon relative movement of said members in said path, and means to prevent excessive movement of said friction element, with the element frictionally engaged thereby, in the release direction of movement of said further member.

4. A silent pawl and ratchet type control mechanism for operating and releasing a brake or like unit, comprising a movable member and a further member relative to which said first named member moves, one of which members is a pawl-carrying member having means mounting a pawl element for movement thereon, the other being a ratchet member having a ratchet element releasably engageable by said pawl element to hold said unit, said movable member being adapted to be operatively connected to said unit and having means mounting the same for movement in a path adjacent and along said further member in operating said unit, an abutment having means mounting the same for movement into and out of position in which it supports said further member for said holding engagement of said pawl and ratchet elements, said further member having means mounting the same for movement in a release direction out of position from said holding engagement of said elements when said abutment is moved out of said supporting position, a friction element on one of said first-named elements frictionally engaged with the other thereof for moving said pawl element on said pawl-carrying member out of position from said holding engagement upon relative movement of said members in said path, means restraining said further member from movement from said abutment-supported position thereof under frictional drag of said friction element, and means to prevent excessive movement of said friction element, with the element frictionally engaged thereby, in the release direction of movement of said further member.

5. A silent pawl and ratchet type control mechanism for operating and releasing a brake or like unit, comprising a ratchet, a movable pawl-carrying member adapted to be operatively connected to said unit and having means mounting the same for movement in a path adjacent and along said ratchet in operating said unit, a pawl having means mounting the same on said member for movement into and out of holding engagement with said ratchet, an abutment having means mounting the same for movement into and out of position in which it supports said ratchet for said holding engagement, said ratchet having means mounting the same for movement in a release direction out of position from said holding engagement when said abutment is moved out of said supporting position, a friction element on said pawl frictionally engaged with said ratchet for moving said pawl out of position from said holding engagement upon movement of said pawl-carrying member in said path, and means restraining said ratchet from movement from said abutment-supported position thereof under frictional drag of said friction element in said last-named movement of said pawl.

6. A silent pawl and ratchet type control mechanism for operating and releasing a brake or like unit, comprising a ratchet, a movable pawl-carrying member adapted to be operatively connected to said unit and having means mounting the same for movement in a path adjacent and along said ratchet in operating said unit, a pawl having means mounting the same on said member for movement into and out of holding engagement with said ratchet, an abutment having means mounting the same for movement into and out of position in which it supports said ratchet for said holding engagement, said ratchet having means mounting the same for movement in a release direction out of position from said holding engagement when said abutment is moved out of said supporting position, a friction element on said pawl frictionally engaged with said ratchet for moving said pawl out of position from said holding engagement upon movement of said pawl-carrying member in said path, and means restraining said friction element and pawl against excessive movement with said ratchet upon movement of the latter in said release direction.

7. A silent pawl and ratchet type control mechanism for operating and releasing a brake or like unit, comprising a ratchet, a movable pawl-carrying member adapted to be operatively connected to said unit and having means mounting the same for movement in a path adjacent and along said ratchet in operating said unit, a pawl having means mounting the same on said member for movement into and out of holding engagement with said ratchet, an abutment having means mounting the same for movement into and out of position in which it supports said ratchet for said holding engagement, said ratchet having means mounting the same for movement in a release direction out of position from said holding engagement when said abutment is moved out of said supporting position, a friction element on said pawl frictionally engaged with said ratchet for moving said pawl out of position from said holding engagement upon movement of said pawl-carrying member in said path, means restraining said ratchet from movement from said abutment-supported position thereof under frictional drag of said friction element in said last-named movement of said pawl, and means restraining said friction element and pawl against excessive movement with said ratchet upon movement of the latter in said release direction.

8. A silent pawl and ratchet type control mechanism for operating and releasing a brake or like unit, comprising a movable member and a further member relative to which said first named member moves, one of which is a pawl-carrying member having a pawl element mounted for movement thereon, the other being a ratchet member having a ratchet element releasably engageable by said pawl element to hold said unit, said movable member being adapted to be operatively connected to said unit and having means mounting the same for movement in a path adjacent and along said further member in operating said unit, means releasably maintaining said further member in position for said holding engagement of said pawl and said ratchet elements, said further member being movable out of position from said holding engagement of said elements when said last named means is operated to release said further member, and a friction element on one of said first-named elements frictionally engaged with the other thereof for moving said pawl element on said pawl-carrying member out of position for said holding engagement upon relaitve movement of said members in said path.

References Cited in the file of this patent

UNITED STATES PATENTS

| | | |
|---|---|---|
| 738,100 | Cuntz | Sept. 1, 1903 |
| 1,696,702 | Watlington | Dec. 25, 1928 |
| 2,130,187 | Jandus | Sept. 13, 1938 |
| 2,308,898 | Skareen | Jan. 19, 1943 |
| 2,694,945 | Jandus | Nov. 23, 1954 |
| 2,835,140 | Cox | May 20, 1958 |
| 2,908,185 | Koskela | Oct. 13, 1959 |

FOREIGN PATENTS

| | | |
|---|---|---|
| 15,686 | Switzerland | Dec. 7, 1897 |
| 526,122 | France | June 24, 1921 |
| 125,193 | Australia | Aug. 12, 1947 |